(12) United States Patent
Dai et al.

(10) Patent No.: US 9,234,961 B2
(45) Date of Patent: Jan. 12, 2016

(54) RADAR DEVICE AND METHOD OF PROCESSING REFLECTION SIGNAL

(71) Applicant: Furuno Electric Co., Ltd., Nishinomiya (JP)

(72) Inventors: Koji Dai, Nishinomiya (JP); Tatsuya Kojima, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 338 days.

(21) Appl. No.: 13/922,182

(22) Filed: Jun. 19, 2013

(65) Prior Publication Data

US 2013/0342386 A1 Dec. 26, 2013

(30) Foreign Application Priority Data

Jun. 21, 2012 (JP) ................................. 2012-139916

(51) Int. Cl.
| | | |
|---|---|---|
| G01S 7/292 | (2006.01) | |
| G01S 13/524 | (2006.01) | |
| G01S 13/58 | (2006.01) | |
| G01S 7/41 | (2006.01) | |
| G01S 13/93 | (2006.01) | |
| G01S 7/288 | (2006.01) | |

(52) U.S. Cl.
CPC .............. *G01S 7/292* (2013.01); *G01S 13/5246* (2013.01); *G01S 13/582* (2013.01); *G01S 7/414* (2013.01); *G01S 13/9307* (2013.01); *G01S 2007/2886* (2013.01)

(58) Field of Classification Search
CPC .......................... G01S 7/04; G01S 7/28; G01S 7/292–7/2922; G01S 7/2927; G01S 13/50; G01S 13/52; G01S 13/522; G01S 13/5244; G01S 13/5246; G01S 13/5248; G01S 13/53; G01S 13/581
USPC ......... 342/104, 115, 116, 159–164, 179, 192, 342/196
See application file for complete search history.

(56) References Cited

U.S. PATENT DOCUMENTS

| | | | | |
|---|---|---|---|---|
| 4,459,592 A | * | 7/1984 | Long | ............................... 342/93 |
| 4,684,950 A | * | 8/1987 | Long | ............................... 342/94 |
| 5,457,462 A | | 10/1995 | Mitsumoto et al. | |
| 5,485,157 A | * | 1/1996 | Long | ............................. 342/160 |
| 5,570,093 A | * | 10/1996 | Aker et al. | ..................... 342/104 |

(Continued)

FOREIGN PATENT DOCUMENTS

| | | |
|---|---|---|
| JP | 07159523 A | 6/1995 |
| JP | 201217995 A | 1/2012 |
| JP | 201217996 A | 1/2012 |

*Primary Examiner* — Peter Bythrow
(74) *Attorney, Agent, or Firm* — Alleman Hall McCoy Russell & Tuttle LLP

(57) ABSTRACT

A radar device is provided, which includes a receiver for transmitting a pulse-shaped radio wave and receiving a corresponding reflection signal as a reception signal, a Doppler processor for generating Doppler processed signals that are signals obtained by separating the reception signal according to Doppler frequencies or signals obtained based on the signals separated, an improvement level calculator for calculating a signal improvement level by comparing an amplitude value of the reception signal with amplitude values of the Doppler processed signals, a signal synthesizer for synthesizing the reception signal and the Doppler processed signals based on the signal improvement levels, and a display processor for generating a radar image based on the synthesized signal.

9 Claims, 9 Drawing Sheets

(56) References Cited

U.S. PATENT DOCUMENTS

| | | | |
|---|---|---|---|
| 5,604,503 A * | 2/1997 | Fowler et al. | 342/378 |
| 5,644,315 A * | 7/1997 | Long | 342/93 |
| 5,781,149 A * | 7/1998 | Long | 342/160 |
| 5,905,459 A | 5/1999 | Bunch | |
| 6,456,231 B1 * | 9/2002 | McEwan | 342/93 |
| 6,614,388 B2 * | 9/2003 | Klinnert et al. | 342/70 |
| 6,809,682 B1 * | 10/2004 | Madewell | 342/160 |
| 7,109,916 B2 * | 9/2006 | Klinnert et al. | 342/134 |
| 7,567,202 B2 * | 7/2009 | Pearson et al. | 342/81 |
| 7,642,951 B2 * | 1/2010 | Onorato | 342/93 |
| 7,741,992 B2 * | 6/2010 | Wang et al. | 342/93 |
| 8,013,781 B2 * | 9/2011 | Stockmann | 342/93 |
| 8,125,374 B2 * | 2/2012 | Edwards | 342/93 |
| 8,264,395 B2 * | 9/2012 | Fujikawa et al. | 342/26 R |
| 8,456,350 B2 * | 6/2013 | Wood | 342/159 |
| 8,456,352 B2 * | 6/2013 | Wood | 342/205 |
| 8,581,774 B2 * | 11/2013 | Heilmann et al. | 342/26 R |
| 8,665,135 B2 * | 3/2014 | Dai | 342/41 |
| 8,830,117 B2 * | 9/2014 | Maeno | 342/92 |
| 2003/0052814 A1 * | 3/2003 | Corbrion et al. | 342/104 |
| 2005/0179586 A1 * | 8/2005 | Klinnert et al. | 342/137 |
| 2006/0181448 A1 * | 8/2006 | Natsume et al. | 342/70 |
| 2009/0096662 A1 * | 4/2009 | Wang et al. | 342/93 |
| 2010/0158152 A1 * | 6/2010 | Edwards | 375/285 |
| 2010/0214151 A1 * | 8/2010 | Kojima et al. | 342/28 |
| 2010/0289690 A1 * | 11/2010 | Dai | 342/41 |
| 2011/0260908 A1 * | 10/2011 | New et al. | 342/59 |
| 2012/0007766 A1 * | 1/2012 | Maeno | 342/91 |
| 2012/0007767 A1 * | 1/2012 | Maeno | 342/92 |

* cited by examiner

BEFORE DOPPLER PROCESSING (CONVENTIONAL ART)

AFTER DOPPLER PROCESSING (CONVENTIONAL ART)

PRESENT EMBODIMENT

BEFORE DOPPLER PROCESSING (CONVENTIONAL ART)

AFTER DOPPLER PROCESSING (CONVENTIONAL ART)

PRESENT EMBODIMENT

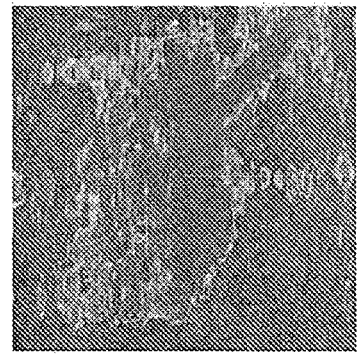
FIG. 7C PRESENT EMBODIMENT
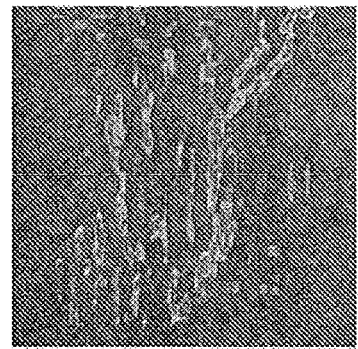
FIG. 7B AFTER DOPPLER PROCESSING (CONVENTIONAL ART)
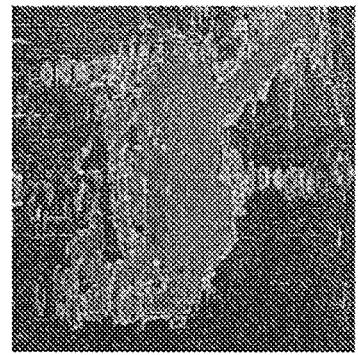
FIG. 7A BEFORE DOPPLER PROCESSING (CONVENTIONAL ART)

RADAR DEVICE AND METHOD OF PROCESSING REFLECTION SIGNAL

CROSS-REFERENCE TO RELATED APPLICATION(S)

The application claims priority under 35 U.S.C. §119 to Japanese Patent Application No. 2012-139916, which was filed on Jun. 21, 2012, the entire disclosure of which is hereby incorporated by reference.

TECHNICAL FIELD

The present invention relates to a radar device for suppressing an unused signal contained in a reception signal, while preventing a necessary signal (a signal indicative of a target object) from being suppressed.

BACKGROUND OF THE INVENTION

Signals which a radar antenna receives (reception signals) include echoes from waves, echoes from rain or snow, besides echoes from target objects or land. For this reason, in order to suppress such unused echoes, processing for subtracting only a given amount of signal level from the reception signals (gain adjustment) has been conventionally carried out. JP2012-017995A and JP2012-017996A disclose radar devices which carry out such a kind of processing.

JP2012-017995A and JP2012-017996A disclose the radar devices which calculate and set a suitable threshold according to a distance from a ship concerned based on the reception signal.

JP07-159523A discloses a radar device for carrying out Doppler processing to the reception signal. The Doppler processing is to exactly detect target objects (e.g., other ships) with relative speeds by utilizing that frequencies of the reception signals differ according to the differences in speed (relative speeds) of the target objects with respect to the ship concerned.

Specifically, the radar device disclosed in JP07-159523A is provided with two circuits comprised of a plurality of filters which separate one reception signal from the other. Therefore, one of the circuits has a different center frequency of the filter from the other. As a result of the signal processing, the device only outputs either one of the circuits' outputs having larger amplitude.

However, like JP2012-017995A and JP2012-017996A, when only performing the threshold processing and not performing the Doppler processing (for example, when amplitudes of a clutter echo and a ship echo are about the same), a detection of the ship will be difficult.

On the other hand, in the Doppler processing, processing for suppressing signals which are continuous in a distance direction is performed to suppress clutters. Therefore, echoes from land may also be suppressed (see FIGS. 7A and 7B). In addition, in the Doppler processing, since removal processing is performed after separating the signals based on the relative speeds, echoes from clutters and target objects at the same speed may also be suppressed.

SUMMARY OF THE INVENTION

The present invention is made in view of the above situations, and it provides a radar device for suppressing only an unused signal by performing processing to a reception signal, which utilizes advantages of Doppler processing, while eliminating disadvantages thereof.

According to one aspect of the invention, a radar device is provided, which includes a receiver for transmitting a pulse-shaped radio wave and receiving a corresponding reflection signal as a reception signal, a Doppler processor for generating Doppler processed signals that are signals obtained by separating the reception signal according to Doppler frequencies or signals obtained based on the signals separated, an improvement level calculator for calculating a signal improvement level by comparing an amplitude value of the reception signal with amplitude values of the Doppler processed signals, a signal synthesizer for synthesizing the reception signal and the Doppler processed signals based on the signal improvement levels, and a display processor for generating a radar image based on the synthesized signal.

Thus, since the radar image can be created taking advantages of both the reception signal and the Doppler processed signals (or compensating disadvantages of both), an S/N (S/C) can be improved. In particular, dropping of echo levels of land and dropping of an S/N of clutter and target object(s) at the same speed, which are disadvantages of the Doppler processing, can be eliminated.

The improvement level calculator may calculate the signal improvement level after noise floors of the reception signal and the Doppler processed signals are unified.

Thus, since the basis of the amplitude levels of the reception signal and the Doppler processed signal can be united, both the signals are accurately compared and a further appropriate comparison result can be obtained.

The reception signal may include a plurality of reception signals. The Doppler processor may remove an average value for every distance from the signals separated from each of the reception signals according to the Doppler frequencies.

Thus, signals contained in the reception signal can be separated by relative speeds with respect to the radar device. In general, the relative speed of clutter is constant over a wide area, and, on the other hand, target object(s) are located within a certain area. Therefore, clutter can be removed from the reception signal by performing this processing.

The improvement level calculator may calculate the signal improvement level for every signal separated by the Doppler processor.

Thus, clutter can be further suppressed compared with the configuration in which one signal is selected from the plurality of signals which are separated by the Doppler processor and the selected signal is compared with the reception signal.

The radar image may be created based on the amplitude value of the reception signal for a part of the reception signal where the amplitude value of the reception signal is larger than the amplitude value of the Doppler processed signal, and based on a value obtained by adding, a value obtained by subtracting the amplitude value of the reception signal from the amplitude value of the Doppler processed signal, to the amplitude value of the reception signal, for other parts of the reception signal.

Thus, a specific configuration in which the Doppler processed signals and the reception signal are combined and the combined signal is outputted can be attained. In addition, processing such as a moving average calculation and a deduction can be performed to "the value obtained by subtracting the amplitude value of the reception signal from the amplitude value of the Doppler processed signal."

The radar image may be created based on the amplitude value of the reception signal for a part of the reception signal where the amplitude value of the reception signal is larger than the amplitude value of the Doppler processed signal, and based on the amplitude value of the Doppler processed signal for other parts of the reception signal.

Thus, a specific configuration in which the Doppler processed signals and the reception signal are combined and the combined signal is outputted can be attained. In addition, this processing is simpler as compared with the configuration in which the amplitude value of the reception signal is subtracted from the amplitude value of the Doppler processed signals, and, after that, the addition is carried out.

The radar device may further include a target object emphasizer for determining the existence of a target object based on the signal improvement level and emphasizing the signal which is determined to be a target object.

Thus, target object(s) can be displayed more exactly.

The target object emphasizer may determine the signal to be the target object when the amplitude value of the Doppler processed signal is larger than the amplitude value of the reception signal.

Thus, target object(s) can be more exactly displayed with an easy and appropriate determination method.

According to another aspect of the invention, a method of processing a reflection signal is provided, which includes the steps of transmitting a pulse-shaped radio wave and receiving a corresponding reflection signal as a reception signal, generating Doppler processed signals that are signals obtained by separating the reception signal according to Doppler frequencies or signals obtained based on the signals separated, calculating a signal improvement level by comparing an amplitude value of the reception signal with amplitude values of the Doppler processed signals, synthesizing the reception signal and the Doppler processed signal based on the signal improvement level, and generating a radar image based on the synthesized signal.

Thus, since the radar image can be created taking advantages of both the reception signal and the Doppler processed signals (or compensating disadvantages of both), an S/N (S/C) can be improved. In particular, dropping of echo levels of land and dropping of an S/N of clutter and target object(s) at the same speed, which are disadvantages of the Doppler processing, can be eliminated.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 7A to 7C are views to compare echoes from land;

DETAILED DESCRIPTION

Figure 1:
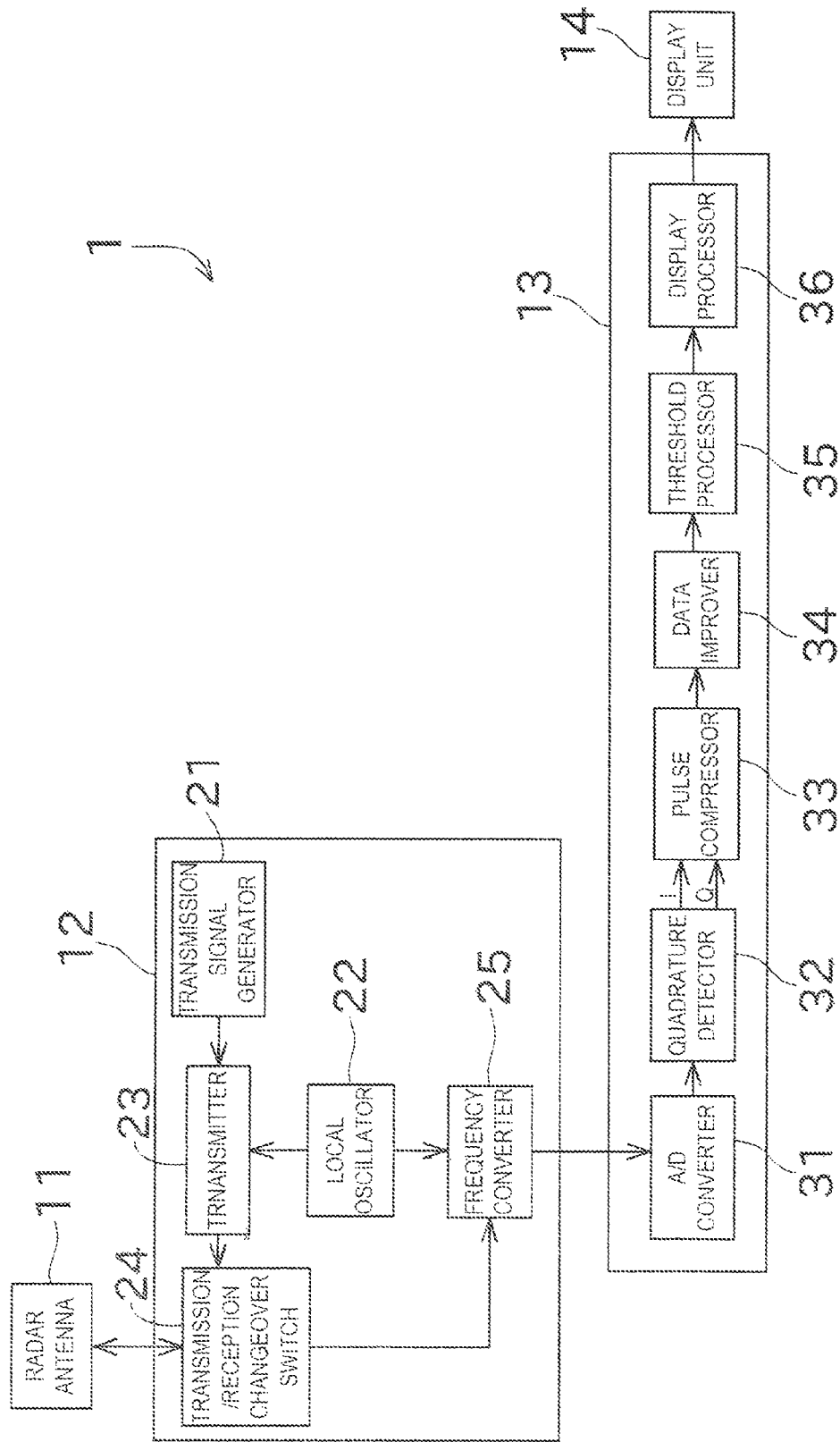
FIG. 1 is a block diagram showing a configuration of a radar device according to one embodiment of the present invention.

Next, one embodiment of the present invention is described with reference to the accompanying drawings. FIG. 1 is a block diagram showing a configuration of a radar device 1 according to one embodiment of the present invention.

The radar device 1 is a pulse compression radar, which transmits radio waves with a long pulse width, and analyzes corresponding reception signals to detect positions and speeds of target objects. Note that the present invention is not limited to the pulse radar device, but may also be applicable to a magnetron radar with a short pulse width, for example. Hereinafter, the configuration of the radar device 1 is described.

As shown in FIG. 1, the radar device 1 includes a radar antenna 11, a transceiver 12 (receiver), a signal processor 13, and a display unit 14.

The radar antenna 11 transmits a microwave as a transmission signal and receives a corresponding echo (a reception signal, a reflection signal) from a target object around the radar antenna. The radar antenna 11 repeats the transmission and reception, while rotating in a horizontal plane at a predetermined cycle. Thus, the radar device 1 can detect target objects in all azimuths around a ship concerned which equips the radar device 1 (hereinafter, referred to as "the ship" to distinguish from other ships).

The transceiver 12 includes a transmission signal generator 21, a local oscillator 22, a transmitter 23, a transmission/reception changeover switch 24, and a frequency converter 25.

The transmission signal generator 21 generates a microwave having a predetermined wave shape. The local oscillator 22 generates a local signal for converting the microwave generated by the transmission signal generator 21 into a signal in a predetermined frequency band. The transmitter 23 generates a transmission signal based on the microwave generated by the transmission signal generator 21 and the local signal, and outputs it to the transmission/reception changeover switch 24.

The transmission/reception changeover switch 24 switches between transmission and reception of the microwave. Specifically, the transmission/reception changeover switch 24 outputs the transmission signal outputted from the transmitter 23 to the radar antenna 11, when transmitting the transmission signal externally. On the other hand, the transmission/reception changeover switch 24 outputs the reception signal received by the radar antenna 11 to the frequency converter 25, when receiving the reception signal from the outside.

The frequency changer 25 converts the reception signal into a baseband signal using the local signal generated by the local oscillator 22. The reception signal converted by the frequency converter 25 is outputted to the signal processor 13.

The signal processor 13 includes an A/D converter 31, a quadrature detector 32, a pulse compressor 33, a data improver 34, a threshold processor 35, and a display processor 36.

The A/D converter 31 converts the analog reception signal into a digital signal.

The quadrature detector 32 branches the inputted reception signal into two, only one signal being shifted by 90° in phase. Thus, the quadrature detector 32 generates two signals consisting of an I-signal and a Q-signal from a single reception signal.

The pulse compressor 33 receives a set of the I-signal and the Q-signal, and compresses their pulse widths. Thus, even if the outputted microwave is weak, a reception signal having substantially the same intensity as the magnetron radar can be obtained.

The data improver 34 performs signal processing such that noise is removed from the reception signal to clearly display a target object. Note that the details of this signal processing which the data improver 34 performs will be described later.

The threshold processor 35 sets a suitable threshold to detect only target object(s) from the signal outputted from the data improver 34. Then, the threshold processor 35 outputs a part of the signal with larger amplitude than the threshold to the display processor 36.

The display processor 36 generates a radar image based on the signal outputted from the threshold processor 35. The radar image generated by the display processor 36 is displayed on the display unit 14 which may be provided with a liquid crystal display.

Figure 2:
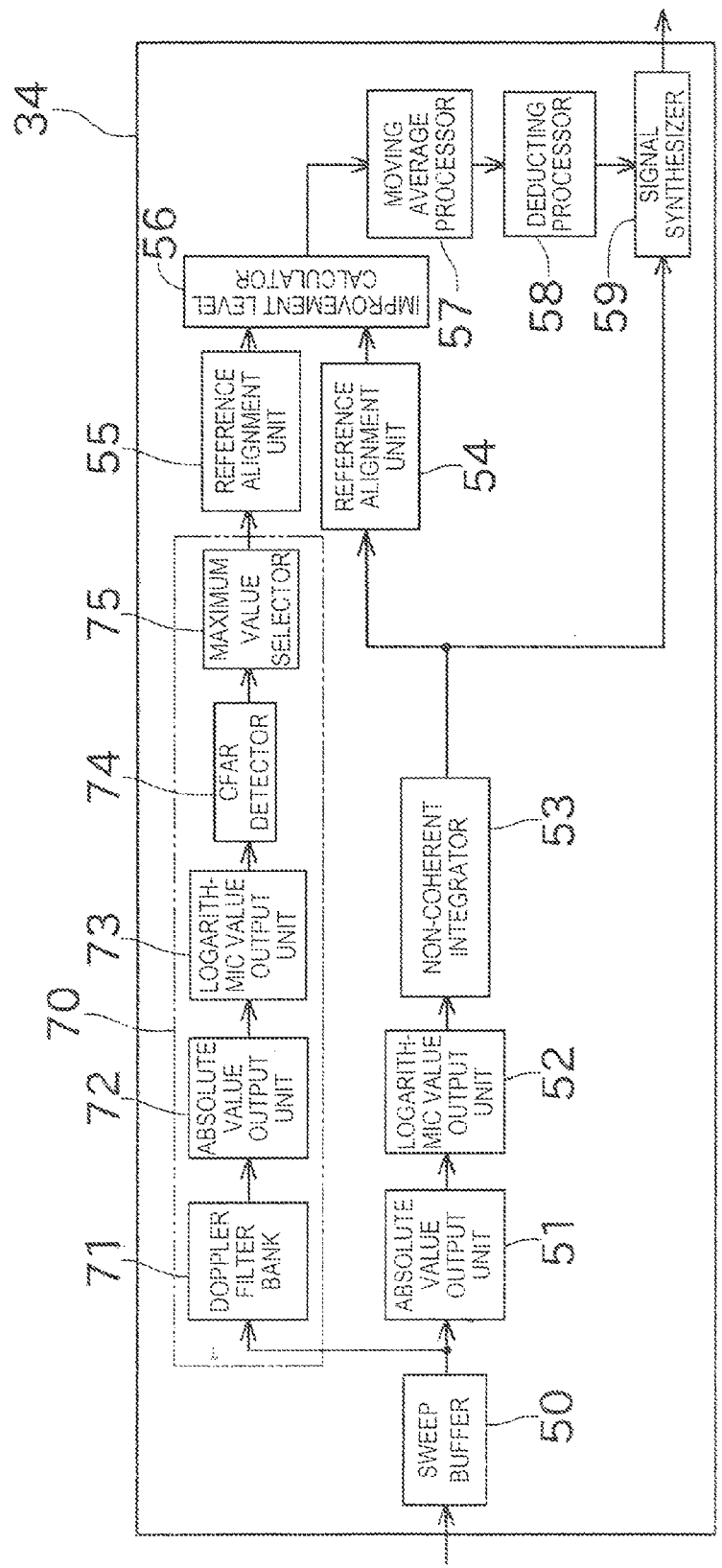
FIG. 2 is a block diagram showing a configuration of a data improver.
Figure 3:
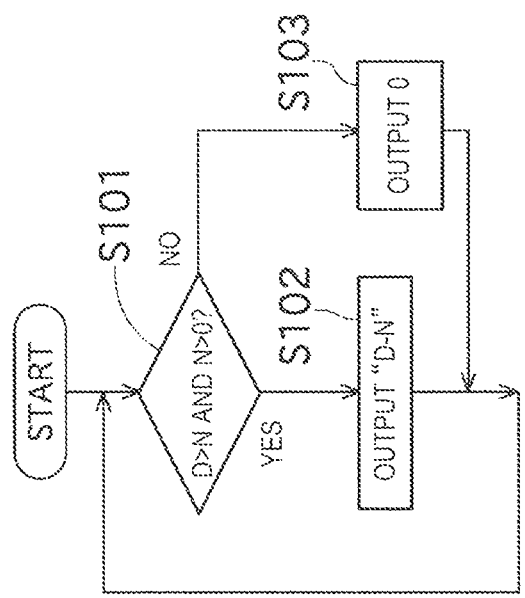
FIG. 3 is a flowchart showing processing performed by an improvement level calculator.

Next, referring to FIGS. 2 and 3, and 4A to 4D, processing which the data improver 34 performs will be described in detail. FIG. 2 is a block diagram showing a configuration of the data improver 34. FIG. 3 is a flowchart showing processing which the improvement level calculator 56 performs. FIGS. 4A to 4D are graphs for conceptually illustrating the reception signal, the Doppler processed signals, the synthesized signal, and the threshold processed signal.

As shown in FIG. 2, the data improver 34 includes a Doppler processor 70, a sweep buffer 50, an absolute-value output unit 51, a logarithmic-value output unit 52, a non-coherent integrator 53, reference alignment units 54 and 55, an improvement level calculator 56, a moving average processor 57, a deducting processor 58, and a signal synthesizer 59.

The sweep buffer 50 stores complex-number data series of a predetermined number of sweeps (e.g., 16 sweeps) centering on a particular azimuth (e.g., a bearing at which processing is carried out), for the signals outputted from the pulse compressor 33.

The absolute-value output unit 51 outputs an absolute value of the complex-number data (i.e., amplitude). The logarithmic-value output unit 52 converts the amplitude into a logarithmic value. In this embodiment, the absolute-value output unit 51 converts it into the logarithmic value by multiplying a common logarithm of the amplitude value by 20. Below, this logarithmic value is referred to as an "amplitude level." Note that the processing of the absolute-value output unit 51 and the logarithmic-value output unit 52 are performed to the predetermined number of sweeps, respectively.

For the reception signals represented by the amplitude levels, the non-coherent integrator 53 calculates an average value of the amplitude levels in the complex-number data series in the directions of the sweeps for every range (every predetermined distance from the ship), and outputs it to the reference alignment unit 54 and the signal synthesizer 59.

For the reception signals inputted from the non-coherent integrator 53, the reference alignment unit 54 calculates an average value for every range, and subtracts the average value from the inputted reception signal. Note that a known CFAR (Constant False Alarm Rate) or the like may be used for the calculation of the average value. The reception signal for which the signal processing by the reference alignment unit 54 was performed is outputted to the improvement level calculator 56.

On the other hand, the sweep data stored in the sweep buffer 50 are outputted to the Doppler processor 70 as well. Hereinafter, processing performed in the Doppler processor 70 is described.

The Doppler processor 70 includes a Doppler filter bank 71, an absolute-value output unit 72, a logarithmic-value output unit 73, a CFAR detector 74, and a maximum-value selector 75.

The Doppler filter bank 71 applies a discrete Fourier transformation to the complex-number data series in the directions of the sweeps for every range. Thus, the reception signal can be separated into plurality of signals (for example, 32 signals) according to the Doppler frequencies (according to the relative speeds with respect to the ship).

The absolute-value output unit 72 and the logarithmic-value output unit 73 perform processing equivalent to the absolute-value output unit 51 and the logarithmic-value output unit 52 described above for each of the separated signals. The CFAR detector 74 performs a CFAR detection for each of the separated signals. The maximum-value selector 75 selects a signal with the largest amplitude level from the separated signals for every range, and outputs it to the reference alignment unit 55. Note that, in this embodiment, the signal outputted from the maximum-value selector 75 is referred to as a "Doppler processed signal."

Figure 4A:
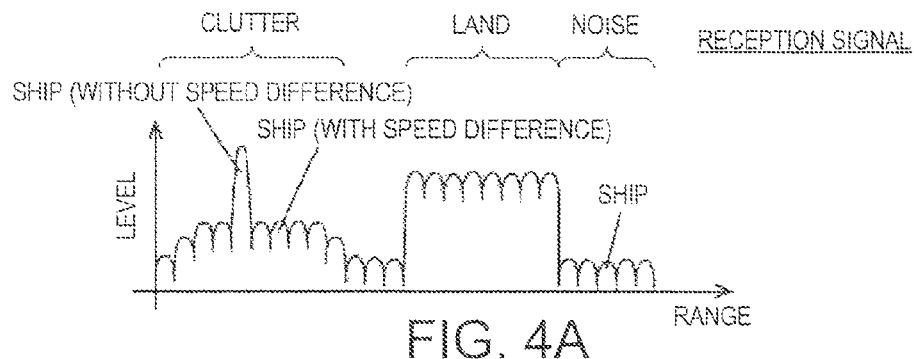
FIGS. 4A to 4D are graphs for conceptually illustrating a reception signal, a Doppler processed signal, a signal after synthesizing, and a threshold processed signal.

Here, a change of the reception signal by the Doppler processing is described. FIG. 4A is a graph schematically showing signals before performing the Doppler processing. As shown in FIG. 4A, when the amplitude levels of noise and other ships are equal or approximately equal, one cannot be distinguished from the other by the threshold processing.

Figure 4B:
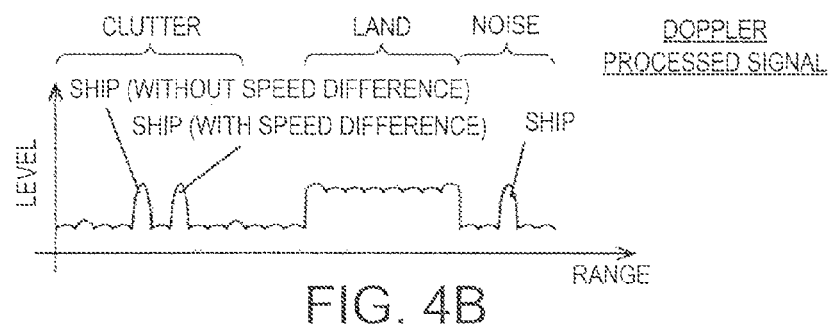

On the other hand, since echoes of clutter and ships with speed differences, and echoes of ships contained in echoes of noise can be extracted by performing the Doppler processing, as shown in FIG. 4B, the echoes of ships in clutter areas or noise areas can be emphasized. However, in this case, echoes of clutter and ships without speed differences and land will be suppressed by the Doppler processing as well.

The radar device of this embodiment can prevent the necessary echoes from being suppressed, by using both the reception signals and the Doppler processed signals. Hereinafter, it is specifically described.

The reference alignment unit 55 into which the Doppler processed signals are inputted performs similar processing to the reference alignment unit 54 described above. Thus, the reception signal which passed the non-coherent integrator 53 and the Doppler processed signal are united in noise floor so that both signals can be compared correctly.

Both the reception signals and the Doppler processed signals are inputted into the improvement level calculator 56. The improvement level calculator 56 performs processing shown in a flowchart of FIG. 3 to these signals. Note that, in the following description and FIG. 3, an amplitude level of the reception signal is represented by "N," and an amplitude level of the Doppler processed signals is represented by "D."

The improvement level calculator 56 compares the inputted reception signal with the inputted Doppler processed signals for every range (S101). Then, the improvement level calculator 56 outputs "D-N" for a range in which "D>N and N>0" (S102).

Here, since the case where D>N indicates that the amplitude level is raised by performing the Doppler processing (i.e., echoes of target objects are emphasized), D-N is outputted (S102). Note that the signal synthesizer 59 adds the reception signals to the outputs from the improvement level calculator 56 (N is added to D-N). Therefore, in this range, the radar image is created based on the Doppler processed signals. Note that N>0 is included in the conditions above because effects of noise troughs are taken into consideration.

On the other hand, for other conditions, 0 is outputted in order to indicate that the amplitude level is lowered (i.e., echoes of target objects are suppressed) by performing the Doppler processing (S103). Therefore, in this range, the radar image is created based on the reception signals. The improvement level calculator 56 performs the above processing for all the ranges. Note that, since the value outputted from the improvement level calculator 56 indicates how much the amplitude level was improved from the reception signal by the Doppler processing, the value may be referred to as a "signal improvement level."

The moving average processor 57 calculates a moving average of a plurality of points (for example, 5 points) in a distance direction for the signals outputted from the improvement level calculator 56. Thus, a discontinuous change of the signal outputted from the improvement level calculator 56 can be suppressed.

The deducting processor 58 sets a threshold (for example, 3 db), which is used for cutting back the amplitude level to deduct by a certain amount, for the signals outputted from the moving average processor 57. The deducting processor 58 outputs 0 for a range indicating an amplitude level lower than the threshold, and outputs the same amplitude level (without changing the amplitude level) for other ranges.

Figure 4C:
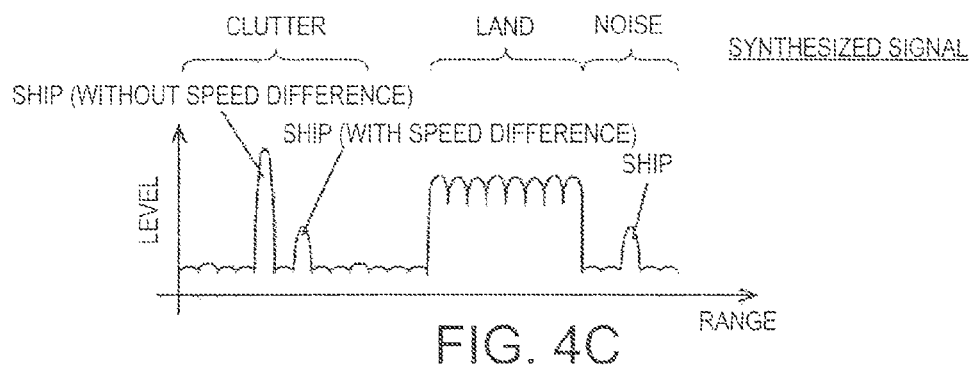
Figure 4D:
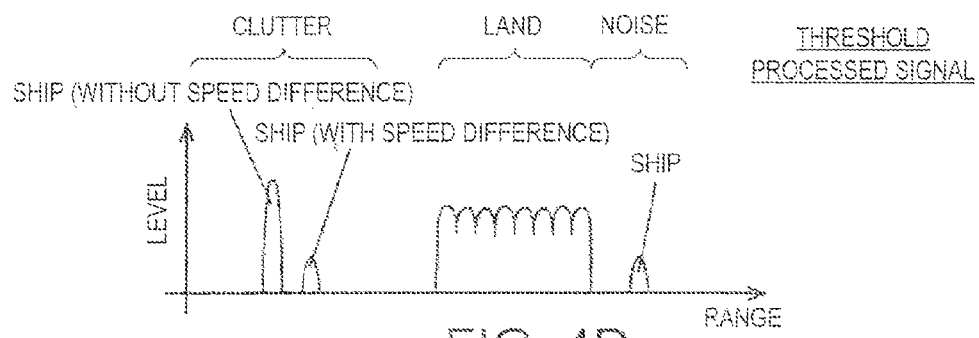

The signal synthesizer 59 adds the signal inputted from the deducting processor 58 to the signal inputted from the noncoherent integrator 53. By the above, a signal utilizing either one of the reception signal and the Doppler processed signal which has a higher amplitude level can be generated. As shown in FIG. 4C, this signal does not drop in the amplitude level of the ship regardless of the existence of the speed difference to clutter, and does not drop in the amplitude level of land, either. Therefore, only unused signals are suppressed. The data improver 34 is thus configured as described above. The signals from which noise are removed are generated by the threshold processing of the threshold processor 35 described above being carried out to the signals outputted from the data improver 34 (see FIG. 4D).

Figure 5A:
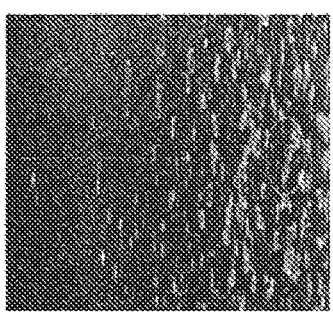
FIGS. 5A to 5C are views to compare echoes from clutters and ships having speed differences.
Figure 5B:
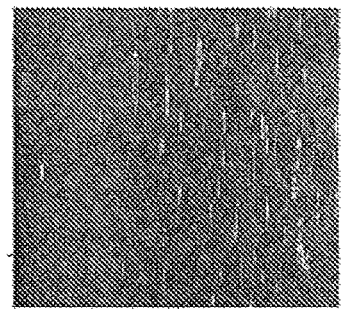
Figure 5C:
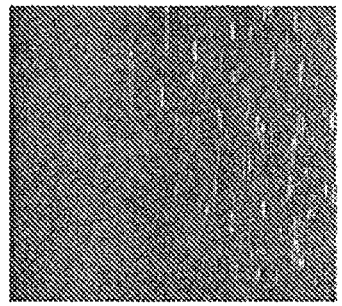
Figure 6A:
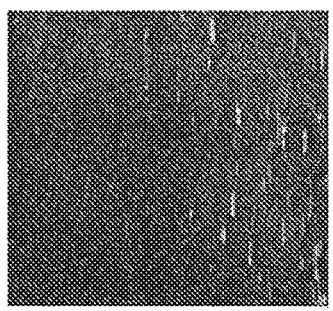
FIGS. 6A to 6C are views to compare echoes from clutters and of ships having no speed difference.
Figure 6B:
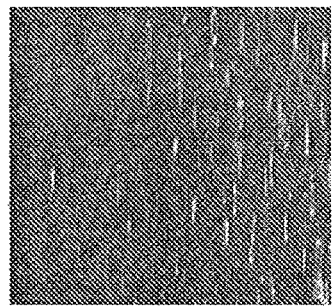
Figure 6C:
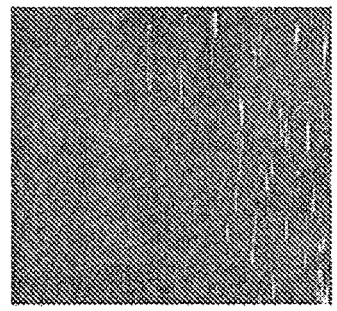

Next, in order to describe the effects of this embodiment, an experiment conducted by the present applicant is described. FIGS. 5A to 5C, FIGS. 6A to 6C, and FIGS. 7A to 7C show radar images obtained from the same reception signals, where FIGS. 5A, 6A and 7A are radar images before the Doppler processing, FIGS. 5B, 6B and 7B are radar images after the Doppler processing, and FIGS. 5C, 6C and 7C are radar images after the processing of this embodiment.

In FIGS. 5A to 5C, echoes of clutter and a ship with a speed difference are circled with broken lines. In addition, in order to compare effects of clutter, each image is adjusted so that the ship echo is displayed at the same intensity. Therefore, in FIGS. 5B and 5C, the effects of clutter are suppressed, as compared with FIG. 5A. This indicates that the echoes of clutter and the ship with the speed difference are emphasized by the Doppler processing.

In FIGS. 6A to 6C, echoes of clutter and a ship without a speed difference are circled with broken lines. In addition, in order to compare the effects of clutter, each image is adjusted so that the ship echo is displayed at the same intensity. Therefore, in FIGS. 6A and 6C, the effects of clutter are suppressed, as compared with FIG. 6B. This indicates that echoes of clutter and a ship without the speed difference are suppressed by the Doppler processing.

FIGS. 7A to 7C are radar images showing echoes from land. In FIGS. 7A and 7B, the land echoes are displayed clearly, as compared with FIG. 7B. This is because the land echoes are suppressed by the Doppler processing for suppressing echoes which exist over a plurality of ranges.

Thus, in this embodiment, it can prevent that necessary echoes, such as echoes from ships and land, are suppressed, while suppressing clutter and the like. That is, the negative influences associated with the Doppler processing can be eliminated.

Figure 8:
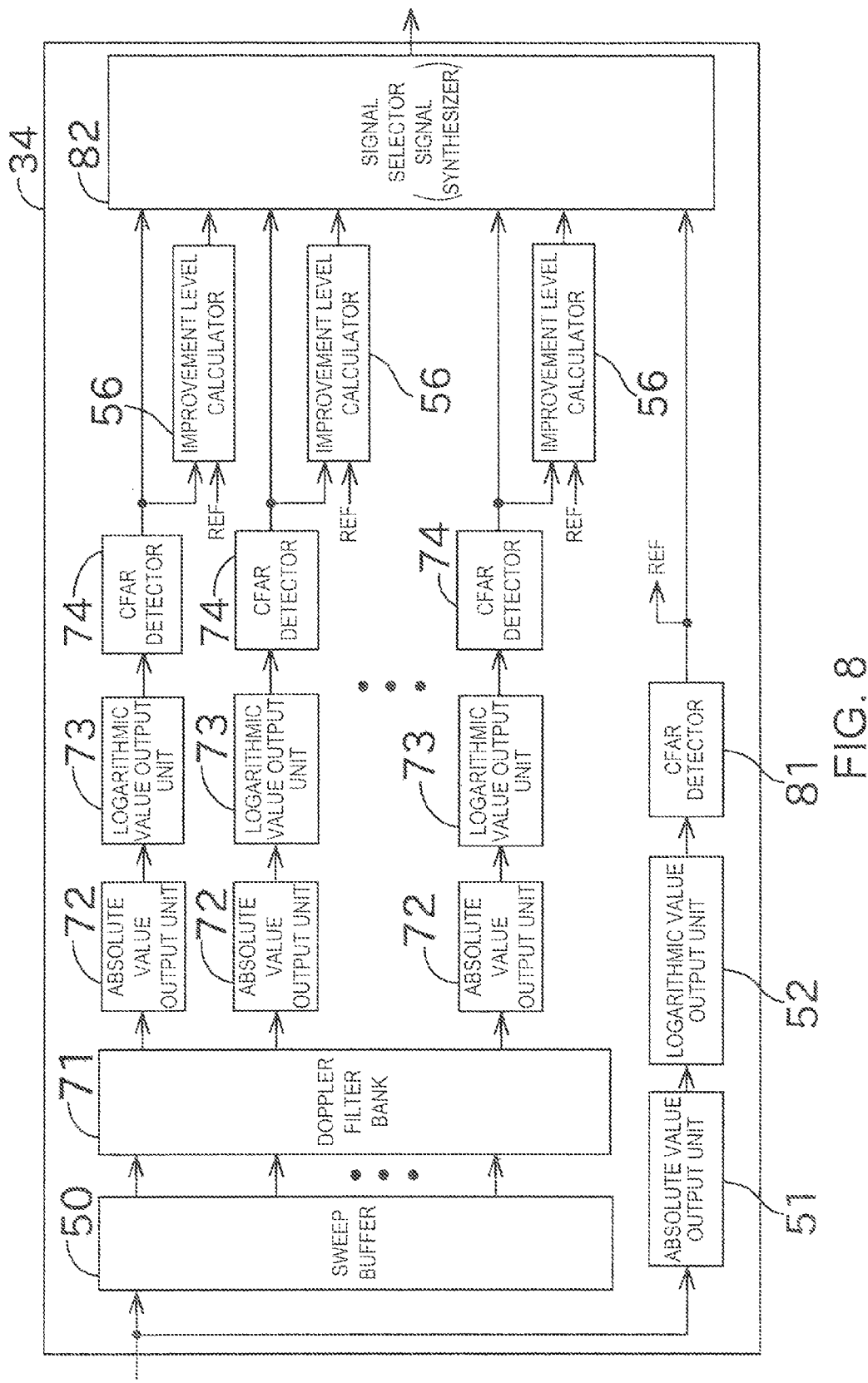
FIG. 8 is a block diagram of a data improver according to a first modification of this embodiment.

Next, a first modification of the above embodiment is described. FIG. 8 is a block diagram of the data improver 34 according to the first modification. In description of the following modifications, the same numerals may be assigned in the drawings to identical or similar members to those in the above embodiment, and their description may be omitted.

The above embodiment has a configuration such that the signal after selecting the maximum value of a plurality of signals which are separated from a reception signal according to Doppler frequencies is compared with the reception signal. On the other hand, this modification has a configuration such that each of signals (i.e., a plurality of signals) before the maximum value is selected is compared with the reception signal. Note that, in this modification, the plurality of signals before selecting the maximum value are simply referred to as "Doppler processed signals." Accordingly, as for the reception signal to be compared, the signal after the CFAR detection is used, not the signal after the coherent integration.

The improvement level calculator 56 compares the amplitude levels of the Doppler processed signals outputted from the CFAR detector 74 with the amplitude levels of the reception signals outputted from a CFAR detector 81. The improvement level calculator 56 outputs the amplitude levels of the Doppler processed signals when the amplitude levels of the Doppler processed signals are larger than those of the reception signals by more than a predetermined threshold, and it otherwise outputs 0. Here, the values outputted from the improvement level calculator 56 (signal improvement level) are represented as $F_1, F_2, \ldots,$ and $F_M$.

The signal selector 82 (signal synthesizer) outputs the largest value among $F_1, F_2, \ldots,$ and $F_M$ for every range. The signal selector 82 outputs the amplitude level of the reception signal when all of $F_1, F_2, \ldots,$ and $F_M$ are 0.

In the above embodiment, even if the signal only contains noise, the maximum-value selector 75 may output the largest amplitude level (i.e., the noise level will become large). In this regard, in this first modification, since each of the plurality of signals separated at the Doppler frequencies is compared with the reception signal, the above-described situation can be avoided. Therefore, the configuration of the first modification can further suppress the noise level.

Further, in the above embodiment, "the difference between the Doppler processed signal and the reception signal or 0" is outputted from the improvement level calculator 56, and the output value and the reception signal are added. As a result, the Doppler processed signal or the reception signal is outputted. On the other hand, in this first modification, the signal selector 82 directly selects the Doppler processed signal or the reception signal, and outputs the selected signal. Thus, if the output is determined based on the Doppler processed signal and the reception signal, the process may be arbitrary and can adopt various processing.

Figure 9:
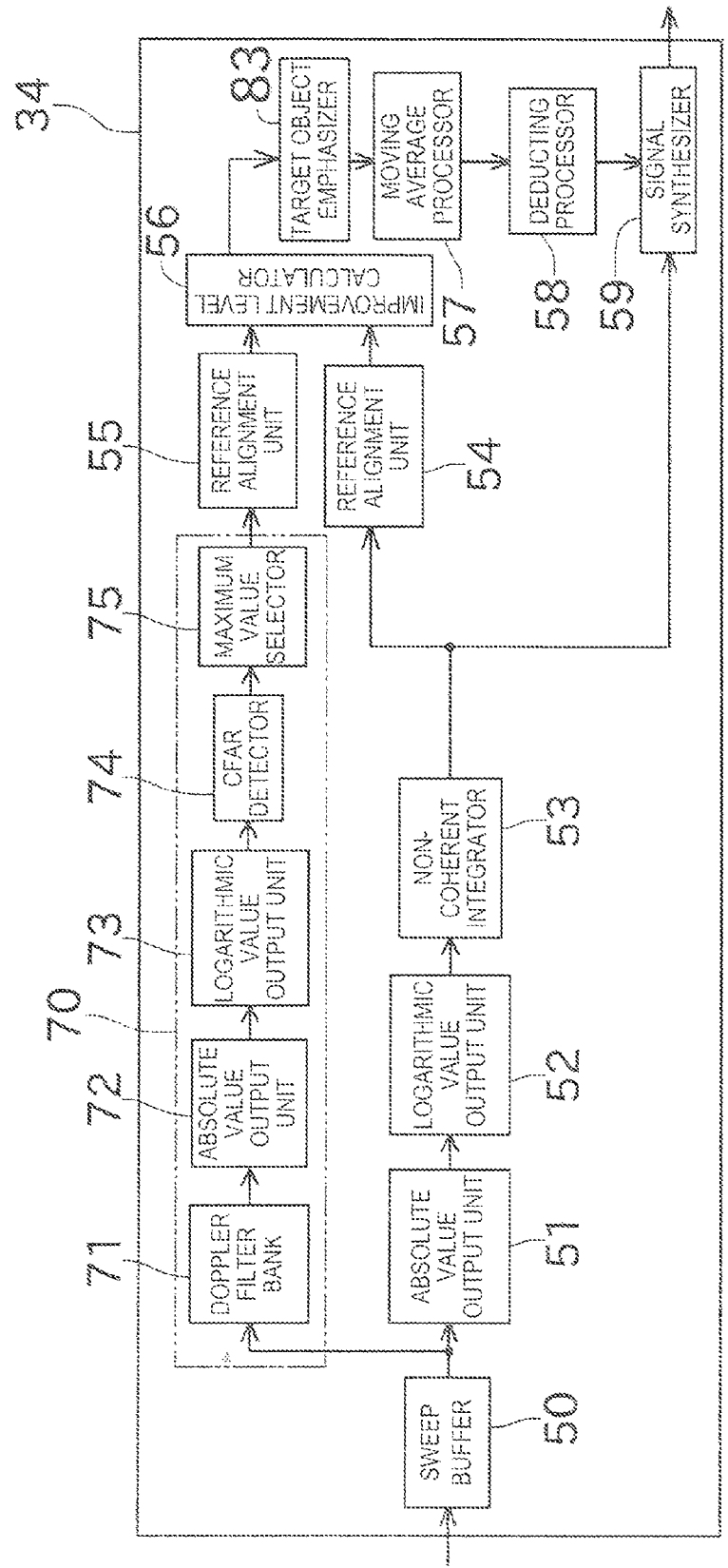
FIG. 9 is a block diagram of a data improver according to a second modification of this embodiment.

Next, a second modification is described. FIG. 9 is a block diagram of a data improver 34 according to the second modification.

The second modification differs from the above embodiment in that a target object emphasizer 83 is arranged downstream of the improvement level calculator 56.

The target object emphasizer 83 emphasizes echoes indicating target object(s). Specifically, "the difference between the Doppler processed signal and the reception signal or 0" outputted from the improvement level calculator 56 is inputted into the target object emphasizer 83. Here, since the difference indicates a part with a high possibility that target object(s) exist because the amplitude level of the Doppler processed signal is larger than that of the reception signal. Therefore, the target object emphasizer 83 enlarges the amplitude level of this part to emphasize the echoes indicating target object(s).

Note that, in this second modification, the amplitude level is enlarged because target object(s) exist when D>N. The criteria to determine the existence of target object(s) are not limited to the above, and arbitrary criteria may be used. Alternatively, the criteria to determine the existence of target object(s) may be changed according to situations. For example, since clutter caused by waves has a large amplitude level, it may be erroneously detected to be target object(s). For this reason, in such a range where clutter caused by waves is detected, the erroneous detection can be prevented by setting narrow criteria to determine the existence of target object(s).

Summarizing the embodiment, the radar device 1 includes the transceiver 12, the Doppler processor 70, the improvement level calculator 56, the signal synthesizer 59, and the display processor 36. The transceiver 12 transmits the pulse-shaped radio wave and receives the reflection signal. The Doppler processor 70 carries out the Doppler processing of the reception signal received by the transceiver 12, and generates the Doppler processed signals. The improvement level calculator 56 calculates a signal improvement by comparing the amplitude value of the reception signal with the amplitude values of the Doppler processed signals. The signal synthesizer 59 synthesizes the reception signal and the Doppler processed signals based on the comparison result of the improvement level calculator 56. The display processor 36 generates the radar image based on the signal synthesized by the signal synthesizer.

Thus, since the radar image is created taking advantage of both the reception signal and the Doppler processed signals (or compensating disadvantages of both), an S/N (S/C) ratio can be improved. In particular, dropping of echo levels of land and dropping of an S/N of the target object with the same speed as clutter, which are disadvantages of the Doppler processing, can be eliminated.

Although only a suitable embodiment and modifications of the present invention are described above, the configurations may also be modified as follows.

In addition, the configurations illustrated by the block diagrams in FIG. 2 and other figures are merely examples, and as long as the configuration of the present invention is provided, a change in order of the processing, a change, an addition or deletion of the processing may be made suitably.

For example, the processing carried out by the reference alignment units 54 and 55 is not limited to the CFAR detection as long as it is processing for comparing both the signals appropriately, and the processing may be moving average processing, for example. In addition, the processing carried out by the improvement level calculator 56 is not only limited to the comparison of the sizes of the amplitude levels, but other various methods may also be used.

The present invention is not limited to the application to the ship radar device, but may also be applied to radar devices carried in other movable bodies, such as an airplane. Alternatively, it may also be applicable to radar devices for route surveillance, other than the application for the movable bodies.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. A radar device, comprising:
   a receiver for transmitting a pulse-shaped radio wave and receiving a corresponding reflection signal as a reception signal;
   a Doppler processor for generating Doppler processed signals that are signals obtained by separating the reception signal according to Doppler frequencies or signals obtained based on the signals separated;
   an improvement level calculator for calculating a signal improvement level by comparing an amplitude value of the reception signal with amplitude values of the Doppler processed signals;
   a signal synthesizer for synthesizing the reception signal and the Doppler processed signals based on the signal improvement levels; and
   a display processor for generating a radar image based on the synthesized signal.

2. The radar device of claim 1, wherein the improvement level calculator calculates the signal improvement level after noise floors of the reception signal and the Doppler processed signal are unified.

3. The radar device of claim 2, wherein the reception signal includes a plurality of reception signals, and
   wherein the Doppler processor removes an average value for every predetermined distance from the signals separated from each of the reception signals according to the Doppler frequencies, each average value being an averaged amplitude level of the reception signals for the respective predetermined distance or being a known Constant False Alarm Rate (CFAR).

4. The radar device of claim 3, wherein the improvement level calculator calculates the signal improvement level for every signal separated by the Doppler processor.

5. The radar device of claim 3, wherein the radar image is created based on the amplitude value of the reception signal for a part of the reception signal where the amplitude value of the reception signal is larger than the amplitude value of the Doppler processed signal, and based on a value obtained by adding, a value obtained by subtracting the amplitude value of the reception signal from the amplitude value of the Doppler processed signal, to the amplitude value of the reception signal, for other parts of the reception signal.

6. The radar device of claim 3, the radar image is created based on the amplitude value of the reception signal for a part of the reception signal where the amplitude value of the reception signal is larger than the amplitude value of the Doppler processed signal, and based on the amplitude value of the Doppler processed signal for other parts of the reception signal.

7. The radar device of claim 3, further comprising a target object emphasizer for determining the existence of a target object based on the signal improvement level and emphasizing the signal which is determined to be a target object.

8. The radar device of claim 7, wherein the target object emphasizer determines the signal to be the target object when the amplitude value of the Doppler processed signal is larger than the amplitude value of the reception signal.

9. A method of operating a radar device, comprising the steps of:

transmitting a pulse-shaped radio wave and receiving a corresponding reflection signal as a reception signal with a receiver of the radar device;
generating Doppler processed signals that are signals obtained by separating the reception signal according to Doppler frequencies or signals obtained based on the signals separated;
calculating a signal improvement level by comparing an amplitude value of the reception signal with amplitude values of the Doppler processed signals;
synthesizing the reception signal and the Doppler processed signal based on the signal improvement level; and
generating a radar image based on the synthesized signal to be displayed on a display of the radar device.

* * * * *